Jan. 14, 1936.  A. DRUCKER  2,027,816
COMPARATOR
Filed Aug. 6, 1931
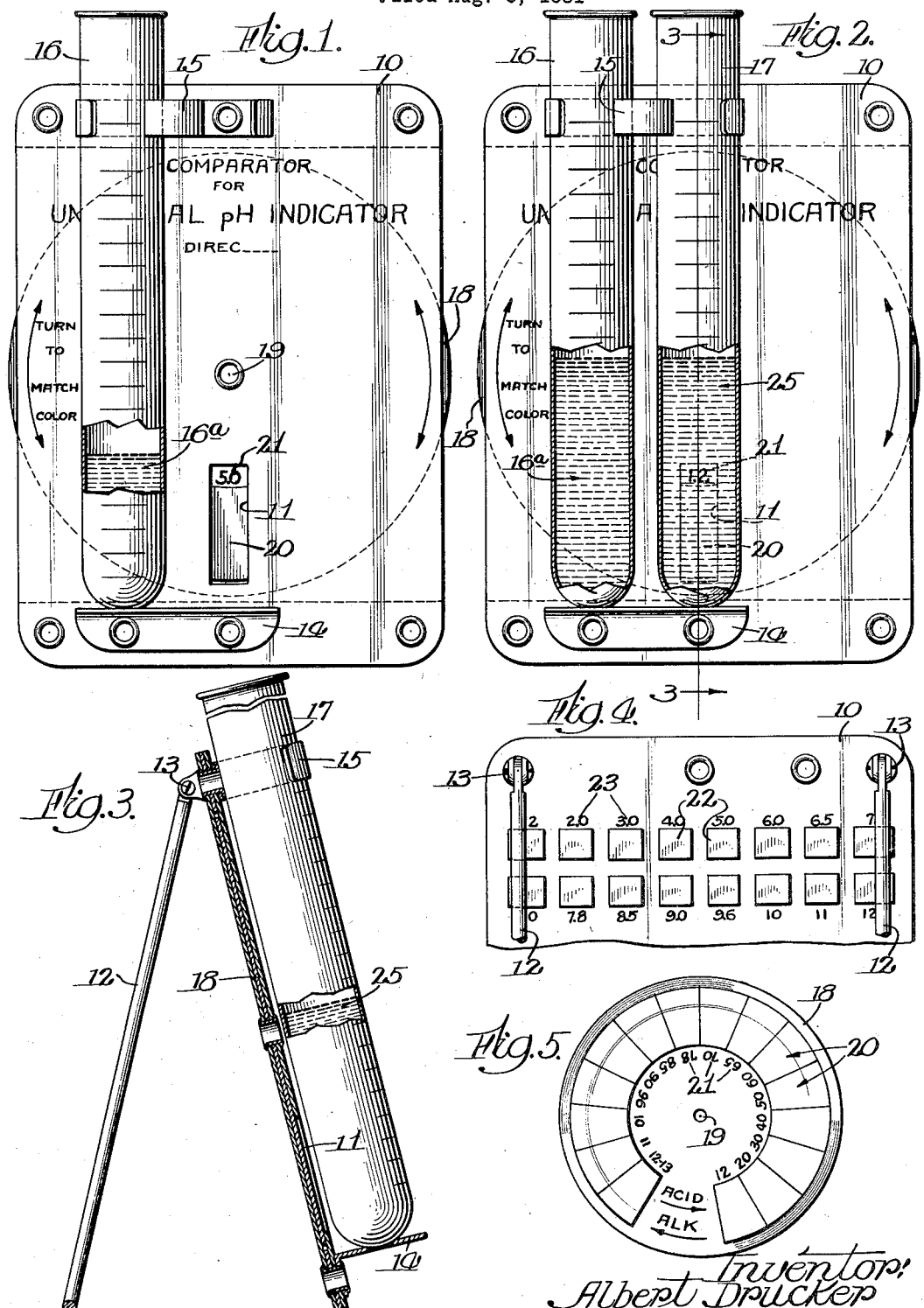
Inventor:
Albert Drucker
BY: [signature] Atty.

Patented Jan. 14, 1936

2,027,816

UNITED STATES PATENT OFFICE 2,027,816

COMPARATOR

Albert Drucker, Chicago, Ill.

Application August 6, 1931, Serial No. 555,538

4 Claims. (Cl. 88—14)

This invention relates to improvements in comparators for use with suitable indicators, and particularly adapted though not necessarily limited in its use for the determination of hydrogen ion concentration, single or successive titrations as in the case of hard water analysis, chlorine determinations with the ortho-tolidine method, blood analysis, etc., and one of the objects of the invention is to provide an improved device of this character for comparing the color of liquids with established colors of a standardized indicator chart or color scale, etc., and which indicator chart may be in the form of colors either painted, printed, lithographed or otherwise produced, each color or indicator on the chart being indicated by a proper designating character in terms of hydrogen ion concentration.

A further object of the invention is to provide in a comparator of this character improved means for holding a sample of the substance whose color is to be compared with colors on the chart, and improved means whereby the chart colors and the sample to be tested may be moved relatively one with relation to the other until the color of the sample and the chart colors are matched as nearly as possible.

A further object is to provide in a device of this character improved means whereby colored or turbid samples and pre-established colors may be brought into such relation that they will combine to effect a similar coloring of or turbidity in the liquid, the color of which is to be tested.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a front elevation of a comparator of this character constructed in accordance with the principles of this invention showing one tube therein, partly broken away.

Figure 2 is a view similar to Figure 1, showing two tubes therein.

Figure 3 is a view taken on line 3—3, Figure 2, with parts omitted, and parts broken away.

Figure 4 is an elevation of a portion of the back of the shield or support for the device.

Figure 5 is a front elevation of the chart or disc carrying the range of colors or indications.

Referring more particularly to the drawing the numeral 10 designates a shield or support which may be of any desired size and configuration and constructed of any suitable material. Within the shield is arranged a window 11 and the shield is adapted to be supported in any desired or suitable manner such as by means of one or more legs 12 pivotally connected to the rear of the shield as at 13, so that the structure as a whole will constitute an easel formation.

Mounted upon the shield in any suitable manner is a support 14 and the support is arranged in close proximity to the window or opening 11. Carried also by the shield is a holder or clasp 15 adapted to receive and hold a container 16, preferably in the form of the well known test tube. When the tube 16 is in position in the clasp 15 the lower end thereof will engage and rest upon the support 14, and a portion of the tube will be disposed in proximity to the window or opening 11. The tube 16 contains the substance, the color of which is to be tested.

If desired, the clasp or holder 15 may be so shaped as to constitute a holder for an additional container or test tube 17 adapted to be placed adjacent and in close proximity to the tube or container 16. This tube or container 17 also rests upon the support 14 and the portion of the holder 15 which engages the tube 17 is so arranged that a portion of the tube 17 will extend over and form a mask for the opening or window 11 in the shield 10.

The numeral 18 designates generally a chart which is preferably in the form of a disc, and this disc is mounted beneath the shield 10 so as to rotate about its axis 19. The disc 18 is opaque and preferably of a diameter somewhat greater than the width of the shield 10 so that portions of the periphery of the disc will project beyond the sides of the shield, thereby affording a means whereby the disc or chart may be rotated with respect to the shield. The said disc extends across and forms a closure for the window or opening 11 in the support 10.

Carried by the disc are a series or group of indicators preferably comprising colors 20 within a pre-established range and each color or group of colors on the disc is provided with a designating character 21 either in the form of figures, letters, words or other characteristics, depending upon the purpose for which the comparator is to be used.

These indications are used in connection with a liquid indicator (commonly known in this art) which is placed within the substance 16ᵃ in the container 16, the color of which is to be tested and the characters and indications 20—21 on the disc or chart 18 are used in connection with the indicator which is placed within the tube or container for the determination of hydrogen ion concentration, single or successive titrations to provide a proper matching of colors to get results reading in terms of a predetermined scale.

On the back of the shield 10 is arranged a complete series of colors 22 and indications 23 corresponding to those carried by the disc 18 and are exposed to enable the operator to readily determine the complete range of colors or indications carried by the disc.

In use and referring to Figure 1, the substance 16ª the color of which is to be tested, is placed within the tube 16, it being understood that the liquid indicator (any well known form of which may be employed) is mixed with the liquid. The tube is then mounted upon the shield 10 by placing it in the holder 15, with the lower end of the tube resting upon the support 14 so that the substance in the tube 16 will be placed in close proximity to the window or opening 11 in the shield. The disc 18 is then revolved in either direction until the color 20 on the disc is matched as nearly as possible with the color of the substance in the tube 16. This color is exposed through the window or opening 11, and at the same time the corresponding indication 21 will also be exposed through the window or opening 11. This will give the matching and proper reading of the hydrogen ion concentration.

It sometimes happens that the substance, the color of which is to be tested, is of a turbid condition or possesses a natural color, in which event it is necessary to counteract or neutralize this natural color, so that a proper matching may be had with the colors or indications 20 on the disc 18. In this event a second tube or container 17 is employed and placed within this second tube is a quantity of the substance 25 of the natural color or turbidity of the substance 16ª before the indicator is mixed with the substance 16ª. The tube 17 is then placed in the holder 15 to rest upon the support 14 so that the tube will extend across the window or opening 11 in the shield 10, thereby constituting or forming a transparent or translucent mask over the color 20 carried by the disc 18 and which is exposed through the window or opening 11.

It will therefore be manifest that when this mask is used the turbid effect or natural color of the substance contained in the tube 16 will be offset or neutralized thereby affording a proper comparison between the colors 20 and the color of the substance 16ª after the indicator has been mixed therewith.

This additional tube 17 containing the liquid 25 provides a complementary or other color to assist in detecting color differences.

With this invention it will be manifest that there is provided a comparator to be used in conjunction with suitable chemical agents (called indicators) which change color values for successive strengths of the material being tested. The pre-established values are represented by the colors 20 and the proper matching of colors give the results reading in terms of a predetermined scale.

While the preferred form of the invention has been herein shown and described, it is to be understood that various changes may be made in the details of construction and in the combination and arrangement of the parts, within the scope of the claims, without departing from the spirit of this invention.

What is claimed as new is:—

1. A comparator embodying an opaque shield, provided with an opening therethrough, a movable element mounted upon and behind said shield and across said opening to form an opaque closure therefor, said element having arranged thereon a scale of pre-established color values adapted to be successively exposed through said opening as the element is rotated upon the shield, means connected with the shield for removably holding a container for a quantity of the substance whose color is to be tested, a portion of said container being disposed in close proximity to the said opening and adjacent that face of the shield opposite to that face adjacent which said element operates, and means for holding a mask over the said opening and in proximity to the portion of the said container which is adjacent the said opening, for assisting in detecting color differences between the said value exposed through said opening and the substance to be tested and whereby the light rays will pass through the substance being tested and be reflected back by the shield through such substance to the eye.

2. A comparator embodying an opaque shield, provided with an opening therethrough, a rotatable disc mounted upon and behind said shield, said disc having arranged thereon a scale of pre-established color values adapted to be successively exposed through said opening as the disc is rotated upon the shield, means connected with the shield for removably holding a container for a quantity of the substance whose color is to be tested, a portion of said container being disposed in close proximity to the said opening and adjacent the face of the shield opposite to that face adjacent which said disc operates, means for holding a mask over the said opening and in proximity to the portion of the said container which is adjacent the said opening, for assisting in detecting color differences between the said value exposed through said opening and the substance to be tested, the said mask comprising a container removably supported by the shield, and a liquid in the last said container.

3. A comparator embodying an opaque shield, provided with an opening therethrough, a movable element mounted upon and behind said shield and across said opening to form a closure therefor, said element having arranged thereon a scale of pre-established color values adapted to be separately exposed through said opening and visible only from the front of the support, as the said element is moved with respect to the shield, means connected with the shield for removably holding a container for a quantity of substance whose color is to be tested adjacent the front of the support, a portion of said container being disposed in close proximity to said opening and in front of the face of the shield opposite to that face adjacent which said element operates, and means for holding a mask over the said opening and in proximity to the portion of the said container which is adjacent said opening, for assisting in detecting color differences between the value exposed through said opening and the substance to be tested.

4. A comparator embodying an opaque shield provided with a sight opening therethrough, an opaque element movably mounted adjacent the back of said shield, extending across and forming a closure for the opening, said element having arranged thereon a scale of pre-established color values adapted to be successively exposed through said opening and visible only from the front of the shield, means connected with the shield for removably holding a container for a quantity of the substance whose color is to be tested adjacent the front of the shield, light rays passing through the container only from in front of the shield, a portion of the container being disposed in close proximity to said opening and adjacent that face of the shield opposite to the face adjacent which said element is disposed and operates, and a mask mounted over the said sight opening and comprising a container removably supported adjacent the front of the shield and containing a liquid, the light rays passing through the mask only from the front side of the shield.

ALBERT DRUCKER.